No. 611,711. Patented Oct. 4, 1898.
C. L. & R. A. SCHULTZ.
TRACTION ENGINE.
(Application filed Mar. 8, 1897.)

(No Model.) 2 Sheets—Sheet 1.

Witnesses: Inventors
Charles L. Schultz
Robert A. Schultz
By H. C. Hunsberger
Att'y.

No. 611,711. Patented Oct. 4, 1898.
C. L. & R. A. SCHULTZ.
TRACTION ENGINE.
(Application filed Mar. 8, 1897.)
(No Model.) 2 Sheets—Sheet 2.
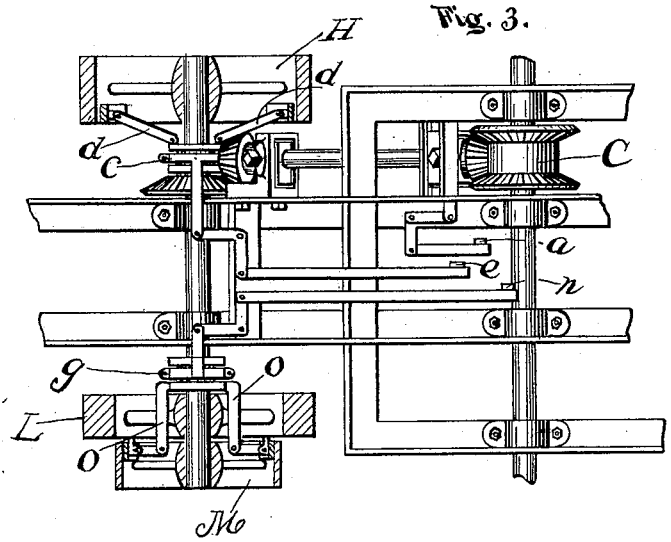
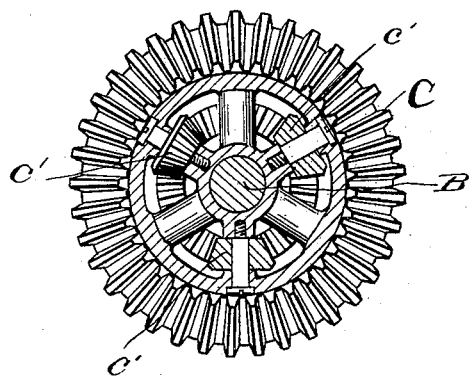
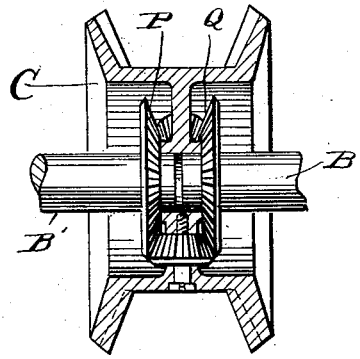
Witnesses:
E. G. Jaeker.
B. Grafenstein.
Inventors
Charles L. Schultz
Robert A. Schultz
By H. C. Hunsberger
Att'y.

UNITED STATES PATENT OFFICE.

CHARLES L. SCHULTZ AND ROBERT A. SCHULTZ, OF CHICAGO, ILLINOIS.

TRACTION-ENGINE.

SPECIFICATION forming part of Letters Patent No. 611,711, dated October 4, 1898.

Application filed March 8, 1897. Serial No. 626,530. (No model.)

*To all whom it may concern:*

Be it known that we, CHARLES L. SCHULTZ and ROBERT A. SCHULTZ, citizens of the United States, residing at Chicago, in the county of Cook and State of Illinois, have invented a new and useful Improvement in Gasolene Traction-Engines, of which the following is a specification.

The objects of our invention are to provide a traction-engine which may be used and operated by means of a gasolene-engine in the same manner as steam traction-engines are now used to operate grain-threshing machines, wood-sawing machines, feed-grinders, feed-cutters, or for other agricultural purposes.

Heretofore the use of gasolene traction-engines for the above purposes has been deemed impracticable, for the reason that with gasolene-engines the reverse movement could not be obtained. Our invention is intended to obviate this difficulty, thereby saving time and labor and providing greater security from fires and better facilities for moving from place to place. We accomplish these objects by means of the mechanism illustrated in the accompanying drawings, in which—

Figure 1:
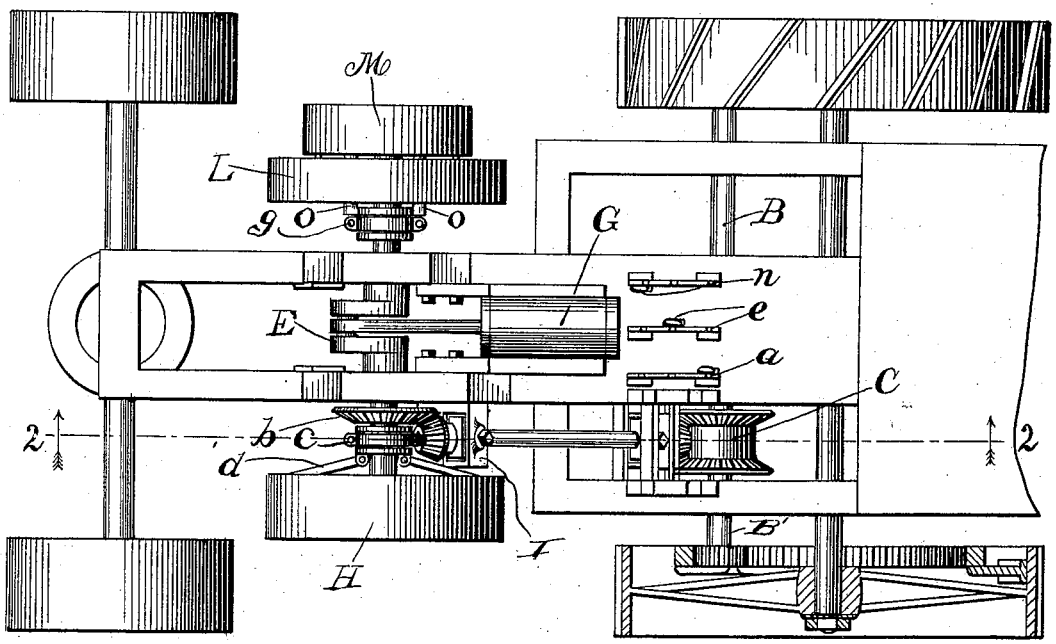
Figure 2:
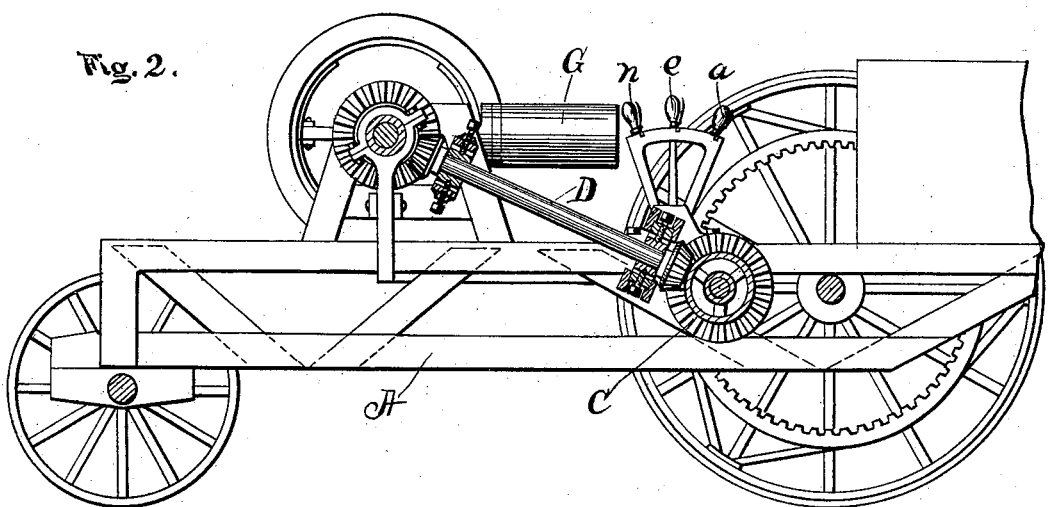

Figure 1 is an elevation of the traction-engine as seen from the top. Fig. 2 is a longitudinal section on line 2, Fig. 1. Fig. 3 is a plan view of the under side of the machine. Fig. 4 is a section of the double-bevel gear-wheel on traction-shaft, also on line 2, Fig. 1. Fig. 5 is a view in detail of the double-bevel gear-wheel.

Similar letters refer to similar parts throughout the drawings.

In the construction of our machine we erect the frame A in the usual manner upon four wheels, two of which are traction-wheels, which engage with the wheels on the traction-shaft. The traction-shaft is in two parts B and B', the abutting ends of which carry two facing bevel-wheels P and Q. Mounted upon the ends of the parts B and B' between the two wheels is a compensating wheel C, the rim or periphery of which is provided with two facing bevels at a slight distance from each other. Journaled between the hub and rim of the wheel C is a series of pinions C', preferably three, each of which engages with both of the wheels P and Q and permits of the rotation of said wheels and the shafts B and B' at variant rates of speed without varying the power that is applied to them through the double-bevel wheel C. This compensating gear accommodates the traction-wheels when departing from a straight line. The wheel describing the longer curve is enabled to move independently of the other, as in turning or in changing the direction of the engine. A shiftable tumbling-rod D engages with the compensating gear C and by means of the connecting-lever *a* may be shifted from one side of the double-bevel gear-wheel C to the other. On one side it obtains the forward movement and on the other the reverse movement, regardless of the forward movement of the gasolene-engine G. In other words, the shifting of the tumbling-rod from side to side by the connecting-lever *a* enables us to move the machine forward or back at pleasure without a reverse movement of the engine. The tumbling-rod D has a pinion at the opposite end, which engages with a bevel gear-wheel *b*, which is loose on the main shaft E, from which motion is obtained from the engine G. Next to the bevel gear-wheel *b* is a collar *c* on the main shaft, which is connected with the arm of the lever *e* and carries two lugs and arms *d d*, which when moved up by the lever *e* sets the friction-clutch in the wheel H. A similar collar *g* on the other end of the main shaft is equipped with lugs and arms *o o*, which pass through the fly-wheel L and operate a friction-clutch (attached to the wheel L) in the pulley-wheel M and gives it motion. The collar *g* is suitably connected with the arm of the lever *n*, and by means of which it is operated. When the lever *a* is moved forward, the tumbling-rod D is shifted to the left and puts the gear in forward motion and by setting the friction-clutch will drive the traction forward. To reverse, we release the friction, shift the tumbling-rod to the other side of the gear, set up the friction-clutch, and the traction will move backward.

Having thus described our invention, what we claim as new, and desire to protect by Letters Patent, is—

1. In a traction-engine, the combination, with a two-part driving-shaft, the abutting ends of which are provided with facing bevel-wheels, of a wheel journaled upon the ends of the shaft between said facing wheels, the rim of which is provided with two facing bevels at a slight distance apart, a series of pinions journaled between the hub and the rim of said wheel, each of which engages with both of the facing bevel-wheels, a tumbling-rod, a shiftable bearing for one end of the same adjacent to said double-bevel wheel, a pinion upon the end of said rod adapted to engage with either of said bevels upon the wheel, a lever for shifting said bearing, and means for imparting motion to said rod from a motor having but one direction, substantially as set forth.

2. In a traction-engine, the combination, with a gasolene power-generator, of a shaft provided with a fly-wheel, a pulley upon each end of said shaft, a clutch for each pulley, a bevel-wheel loosely mounted upon the shaft and connected with one of the clutches, a lever for operating each clutch, a tumbling-rod having a pinion upon each end, one of which is adapted to be engaged by the bevel-wheel upon the shaft and the other one is adapted to be moved laterally, a driving-shaft for the engine provided with a compensating gear, said gear being provided with a double bevel, each of which is adapted to be engaged by the shiftable pinion, and a lever for shifting the tumbling-rod, substantially as set forth.

C. L. SCHULTZ.
ROBERT A. SCHULTZ.

Witnesses:
H. C. HUNSBERGER,
B. GRAFENSTEIN.